(12) United States Patent
Banerjee et al.

(10) Patent No.: US 10,554,495 B2
(45) Date of Patent: Feb. 4, 2020

(54) SENDING HARDWARE SPECIFIC SOFT METRICS FOR EACH OF A PLURALITY OF COMPUTING DEVICES BASED ON A PLAIN LANGUAGE USER POLICY

(71) Applicant: International Business Machines Corporation, Armonk, NY (US)

(72) Inventors: Pradipta K. Banerjee, Karnataka (IN); Sudipta Biswas, Bangalore (IN); Hemant K. Shaw, Karnataka (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 241 days.

(21) Appl. No.: 15/457,779

(22) Filed: Mar. 13, 2017

(65) Prior Publication Data
US 2018/0262400 A1 Sep. 13, 2018

(51) Int. Cl.
*H04L 12/24* (2006.01)
*G06F 9/455* (2018.01)

(52) U.S. Cl.
CPC ...... *H04L 41/0893* (2013.01); *G06F 9/45558* (2013.01); *H04L 41/50* (2013.01); *H04L 41/5009* (2013.01); *H04L 41/5019* (2013.01); *H04L 41/5032* (2013.01); *H04L 41/5038* (2013.01); *G06F 2009/45562* (2013.01); *G06F 2009/45591* (2013.01); *H04L 41/0853* (2013.01); *H04L 41/0883* (2013.01)

(58) Field of Classification Search
CPC . H04L 41/50–5038; H04L 43/06–0817; H04L 47/2491; H04L 47/85; G06F 9/45558; G06F 2009/45591
See application file for complete search history.

(56) References Cited

U.S. PATENT DOCUMENTS

| 7,082,441 B1 | 7/2006 | Zahavi |
| 7,412,503 B2 | 8/2008 | Chess |
| 8,719,804 B2 | 5/2014 | Navendu |
| 9,088,479 B2 | 7/2015 | Heninger |

(Continued)

OTHER PUBLICATIONS

Cesar A.F, De Rose, "Towards Autonomic Detection of SLA violations in cloud infrastructures", Vienna University of Technology, http://www.cloudbus.org/papers/AutonomicSLA-Cloud-FGCS2012.pdf, Last visited Nov. 9, 2016.

*Primary Examiner* — Brendan Y Higa
(74) *Attorney, Agent, or Firm* — Kunzler Bean & Adamson, PC; Bruce R. Needham (57) ABSTRACT

An apparatus for implementing a user policy includes a policy module that issues a user policy for a plurality of computing devices. Two or more of the computing devices have different hardware configurations. The apparatus includes a soft metrics module that, in response to the user policy, sends soft metrics for a computing device of the plurality of computing devices, to determine if the computing device complies with the user policy, where the soft metrics are specific to a hardware configuration of the computing device. The apparatus includes an operational data module that receives, from the computing device, operational data responsive to the soft metrics, and a compliance module that analyzes the operational data to determine if the computing device complies with the user policy.

20 Claims, 7 Drawing Sheets

(56) References Cited

U.S. PATENT DOCUMENTS

| | | |
|---|---|---|
| 2007/0106797 A1* | 5/2007 | Travostino .............. H04L 41/00 709/226 |
| 2007/0180493 A1 | 8/2007 | Croft et al. |
| 2011/0125894 A1* | 5/2011 | Anderson ............. H04L 9/3213 709/224 |
| 2012/0102543 A1* | 4/2012 | Kohli ...................... H04L 63/20 726/1 |
| 2013/0304904 A1 | 11/2013 | Mouline |
| 2016/0205181 A1 | 7/2016 | Norman |
| 2017/0187583 A1* | 6/2017 | Beltt ................... H04L 41/5009 |
| 2017/0364699 A1 | 12/2017 | Goldfarb et al. |
| 2019/0097883 A1 | 3/2019 | Tiwari et al. |

* cited by examiner

SENDING HARDWARE SPECIFIC SOFT METRICS FOR EACH OF A PLURALITY OF COMPUTING DEVICES BASED ON A PLAIN LANGUAGE USER POLICY

FIELD

The subject matter disclosed herein relates to implementing a user policy and more particularly relates to implementing a plain language user policy where the user policy is translated to soft metrics and sent to a plurality of computing devices based on the hardware configurations of the computing devices.

BACKGROUND

In cloud computing and other environments where virtual machines are created to execute workloads, one or more computing devices are allocated for a virtual machine. Workloads and users that submit the workloads may require a particular work environment, such as maximum performance, maximum speed, minimal energy usage, and the like. Typically, commands are sent on a machine level to determine if computing devices can create the environment or to alter operation of the computing devices to create the environment.

BRIEF SUMMARY

An apparatus for implementing a user policy is disclosed. A method and a method for deploying a computer program product also perform the functions of the apparatus. The apparatus includes a policy module that issues a user policy for a plurality of computing devices. Two or more of the computing devices have different hardware configurations. The apparatus includes a soft metrics module that, in response to the user policy, sends soft metrics for a computing device of the plurality of computing devices, to determine if the computing device complies with the user policy, where the soft metrics are specific to a hardware configuration of the computing device. The apparatus includes an operational data module that receives, from the computing device, operational data responsive to the soft metrics, and a compliance module that analyzes the operational data to determine if the computing device complies with the user policy.

A method for implementing a user policy includes issuing a user policy for a plurality of computing devices, where two or more of the computing devices have different hardware configurations, and sending, in response to the user policy, soft metrics for a computing device of the plurality of computing devices, to determine if the computing device complies with the user policy. The soft metrics are specific to a hardware configuration of the computing device. The method includes receiving, from the computing device, operational data responsive to the soft metrics, and analyzing the operational data to determine if the computing device complies with the user policy.

A method for deploying a computer program product, including integrating program instructions into a computing system, where the program instructions in combination with the computing system performs issuing a user policy for a plurality of computing devices, where two or more of the computing devices have different hardware configurations, and sending, in response to the user policy, soft metrics for a computing device of the plurality of computing devices, to determine if the computing device complies with the user policy. The soft metrics are specific to a hardware configuration of the computing device. The program instructions in combination with the computing system performs receiving, from the computing device, operational data responsive to the soft metrics, and analyzing the operational data to determine if the computing device complies with the user policy.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture ("ISA") instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

The computer program product may be deployed by manually loading directly in the client, server and proxy computers via loading a computer readable storage medium such as a CD, DVD, etc., the computer program product may be automatically or semi-automatically deployed into a computer system by sending the computer program product to a central server or a group of central servers. The computer program product is then downloaded into the client computers that will execute the computer program product. Alternatively, the computer program product is sent directly to the client system via e-mail. The computer program product is then either detached to a directory or loaded into a directory by a button on the e-mail that executes a program that detaches the computer program product into a directory. Another alternative is to send the computer program product directly to a directory on the client computer hard drive. When there are proxy servers, the process will, select the proxy server code, determine on which computers to place the proxy servers' code, transmit the proxy server code, then install the proxy server code on the proxy computer. The computer program product will be transmitted to the proxy server and then it will be stored on the proxy server.

The computer program product, in one embodiment, may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit ("CPU") units on the accessed server. CPU units may be units of time such as minutes, seconds, hours on the central processor of the server. Additionally, the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise, when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

The computer program product, in one embodiment, may be deployed, accessed and executed through the use of a virtual private network ("VPN"), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the computer program product (i.e. the software resides elsewhere) wherein the lifetime of the VPN is limited to a given period of time or a given number of deployments based on an amount paid.

The computer program product may be deployed, accessed and executed through either a remote-access or a site-to-site VPN. When using the remote-access VPNs the computer program product is deployed, accessed and executed via the secure, encrypted connections between a company's private network and remote users through a third-party service provider. The enterprise service provider ("ESP") sets up a network access server ("NAS") and provides the remote users with desktop client software for their computers. The telecommuters can then dial a toll-free number or attach directly via a cable or DSL modem to reach the NAS and use their VPN client software to access the corporate network and to access, download and execute the computer program product.

When using the site-to-site VPN, the computer program product is deployed, accessed and executed through the use of dedicated equipment and large-scale encryption that are used to connect a company's multiple fixed sites over a public network such as the Internet.

The computer program product is transported over the VPN via tunneling which is the process of placing an entire packet within another packet and sending it over a network. The protocol of the outer packet is understood by the network and both points, called tunnel interfaces, where the packet enters and exits the network.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

An apparatus for implementing a user policy includes a policy module that issues a user policy for a plurality of computing devices. Two or more of the computing devices have different hardware configurations. The apparatus includes a soft metrics module that, in response to the user policy, sends soft metrics for a computing device of the plurality of computing devices, to determine if the computing device complies with the user policy, where the soft metrics are specific to a hardware configuration of the computing device. The apparatus includes an operational data module that receives, from the computing device, operational data responsive to the soft metrics, and a compliance module that analyzes the operational data to determine if the computing device complies with the user policy.

In one embodiment, the apparatus includes a compliance reply module that sends a compliance message. The compliance message includes an indication of whether the computing device complies with the user policy, and the compliance message is free from operational data. In a further embodiment, the apparatus includes a load assignment module that creates a virtual machine. The virtual machine is operational on one or more computing devices compliant with the user policy, and the virtual machine is configured to execute a workload in compliance with the user policy. In another embodiment, the soft metrics are specific to the hardware configuration of the computing device.

In one embodiment, the soft metrics module sends different soft metrics for each hardware configuration of the plurality of computing devices, where each soft metrics is based on a particular hardware configuration of a computing device of the plurality of computing devices. The operational module receives operational data from each computing device of the plurality of computing devices and the compliance module analyzes operational data from each of the computing devices to determine compliance with the user policy of each of the computing devices of the plurality of computing devices where the analysis for a computing device is based on the hardware configuration of the computing device. In another embodiment, a user policy is free from soft metrics specific to a particular hardware configuration. In another embodiment, the policy module operates via a hypervisor in communication with the plurality of computing devices.

In one embodiment, the apparatus includes a modification module that, in response to the compliance module determining that a computing device of the plurality of computing devices is not in compliance with the user policy, sends updated soft metrics for the computing device. The updated soft metrics include one or more commands to change operation of the computing device to comply with the user policy, where the operational module further receives updated operational data in response to the updated soft metrics and the compliance module further analyzes the updated operational data to determine if the computing device complies with the user policy. In another embodiment, the user policy includes a performance policy, an energy policy, a memory policy, or a speed policy. The performance policy includes optimal performance, the energy policy minimizes energy usage, the memory policy includes maintaining a high memory bandwidth utilization, and the speed policy maximizes execution time.

In one embodiment, the policy module issues the user policy in response to input from a user. In another embodiment, the compliance module further determines if the computing device of the plurality of computing devices is capable of complying with the user policy and the compliance reply module sends a compliance message, where the compliance message includes an indication of whether the computing device complies with the user policy and/or whether the computing device is capable of compliance with the user policy. The compliance message is free from operational data.

A method for implementing a user policy includes issuing a user policy for a plurality of computing devices, where two or more of the computing devices have different hardware configurations, and sending, in response to the user policy, soft metrics for a computing device of the plurality of computing devices, to determine if the computing device complies with the user policy. The soft metrics are specific to a hardware configuration of the computing device. The method includes receiving, from the computing device, operational data responsive to the soft metrics, and analyzing the operational data to determine if the computing device complies with the user policy.

In one embodiment, the method includes sending a compliance message, where the compliance message includes an indication of whether the computing device complies with the user policy, and the compliance message is free from operational data. In another embodiment, the method includes creating a virtual machine. The virtual machine is operational on one or more computing devices compliant with the user policy, and the virtual machine is configured to execute a workload in compliance with the user policy.

In one embodiment, sending soft metrics includes sending different soft metrics for each hardware configuration of the plurality of computing devices, where each soft metrics is based on a particular hardware configuration of a computing device of the plurality of computing devices. In the embodiment, receiving operational data includes receiving operational data from each computing device of the plurality of computing devices, and analyzing the operational data includes analyzing operational data from each of the computing devices to determine compliance with the user policy of each of the computing devices of the plurality of computing devices. The analysis for a computing device is based on the hardware configuration of the computing device.

In another embodiment, the method includes, in response to determining that a computing device of the plurality of computing devices is not in compliance with the user policy, sending updated soft metrics for the computing device. The updated soft metrics include one or more commands to change operation of the computing device to comply with the user policy. In the embodiment, the method includes receiving updated operational data in response to the updated soft metrics and analyzing the updated operational data to determine if the computing device complies with the user policy.

In one embodiment, the method includes issuing the user policy in response to input from a user. In another embodiment, determining if the computing device complies with the user policy also includes determining if the computing device of the plurality of computing devices is capable of complying with the user policy. In the embodiment, the method includes sending a compliance message, where the compliance message includes an indication of whether the computing device complies with the user policy and/or whether the computing device is capable of compliance with the user policy. The compliance message is free from operational data.

A method for deploying a computer program product, including integrating program instructions into a computing system, where the program instructions in combination with the computing system performs issuing a user policy for a plurality of computing devices, where two or more of the computing devices have different hardware configurations, and sending, in response to the user policy, soft metrics for a computing device of the plurality of computing devices, to determine if the computing device complies with the user policy. The soft metrics are specific to a hardware configuration of the computing device. The program instructions in combination with the computing system performs receiving, from the computing device, operational data responsive to the soft metrics, and analyzing the operational data to determine if the computing device complies with the user policy.

In one embodiment, the program instructions in combination with the computing system further sends a compliance message, where the compliance message includes an indication of whether the computing device complies with the user policy. The compliance message is free from operational data.

Figure 1:
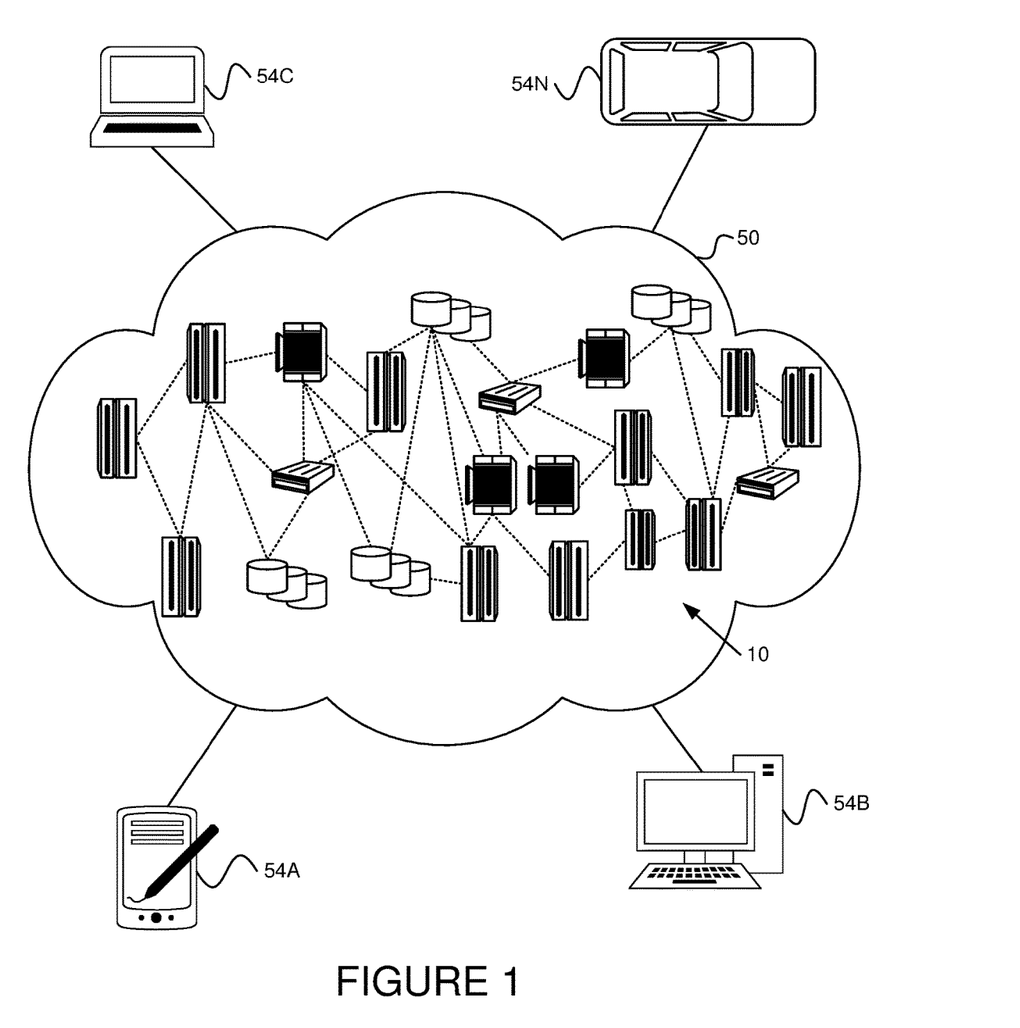
FIG. 1 depicts one embodiment of a cloud computing environment.

FIG. 1 depicts one embodiment of a cloud computing environment 50. As shown, the cloud computing environment 50 includes one or more cloud computing nodes 10 with which local computing devices used by cloud consumers, such as, for example, a personal digital assistant ("PDA") or cellular telephone 54A, a desktop computer 54B, a laptop computer 54C, and/or an automobile computer system 54N may communicate. The nodes 10 may communicate with one another. The nodes 10 may be grouped (not shown) physically or virtually, in one or more networks, such as Private, Community, Public, or Hybrid clouds as described hereinabove, or a combination thereof. This allows the cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that the computing nodes 10 and the cloud computing environment 50 can communicate with any type of computerized device over any type of network and/or network addressable connection (e.g., using a web browser).

Figure 2:
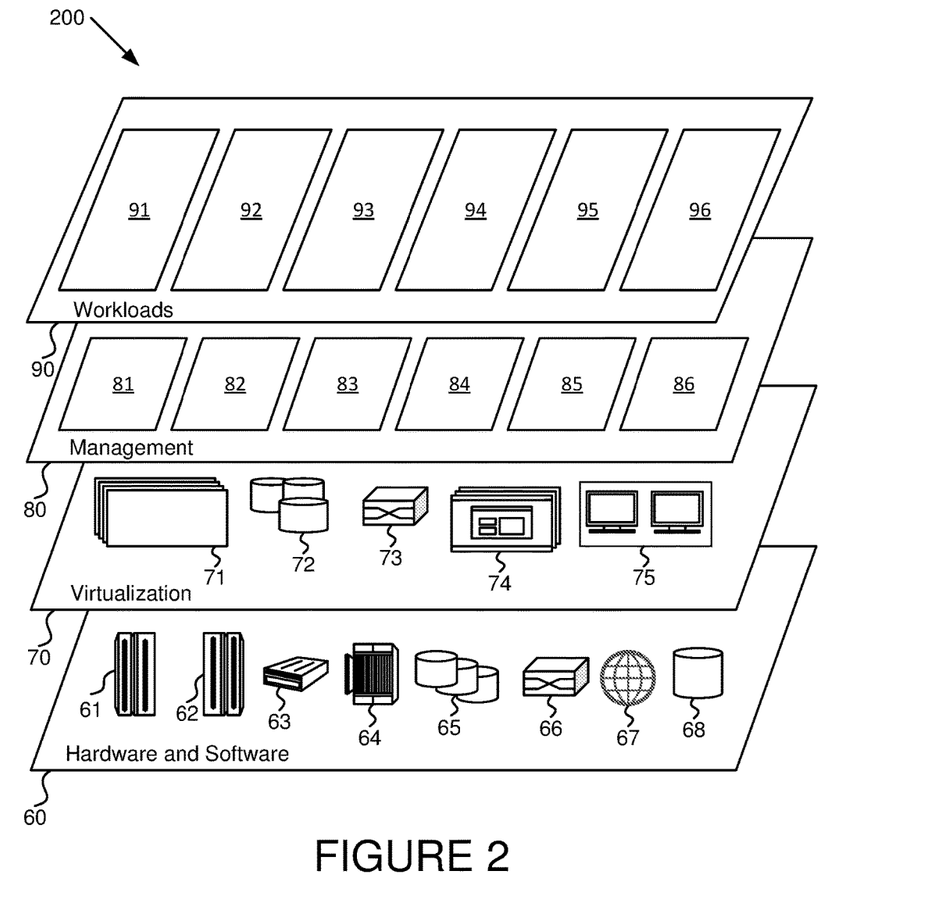
FIG. 2 depicts one embodiment of abstraction model layers.

FIG. 2 depicts one embodiment of abstraction model layers 200 provided by the cloud computing environment 50 as depicted in FIG. 1. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

The virtualization layer 70 provides an abstraction layer from which the following examples of virtual entities may be provided: virtual servers 71; virtual storage 72; virtual networks 73, including virtual private networks; virtual applications and operating systems 74; virtual clients 75, and the like.

In one example, the management layer 80 may provide the functions described below, which are examples and are not meant to be limiting. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. A user policy apparatus 86 sends soft metrics based on hardware configurations of the nodes 10 (which herein may be called computing devices) based on a user policy and determines from operational data from the nodes 10 if the nodes 10 are compliant with the user policy. The user policy apparatus 86 is discussed in more detail with regard to the system 300 and apparatuses 400, 500 of FIGS. 3-5.

The workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; mobile desktop processing 96; and the like.

Figure 3:
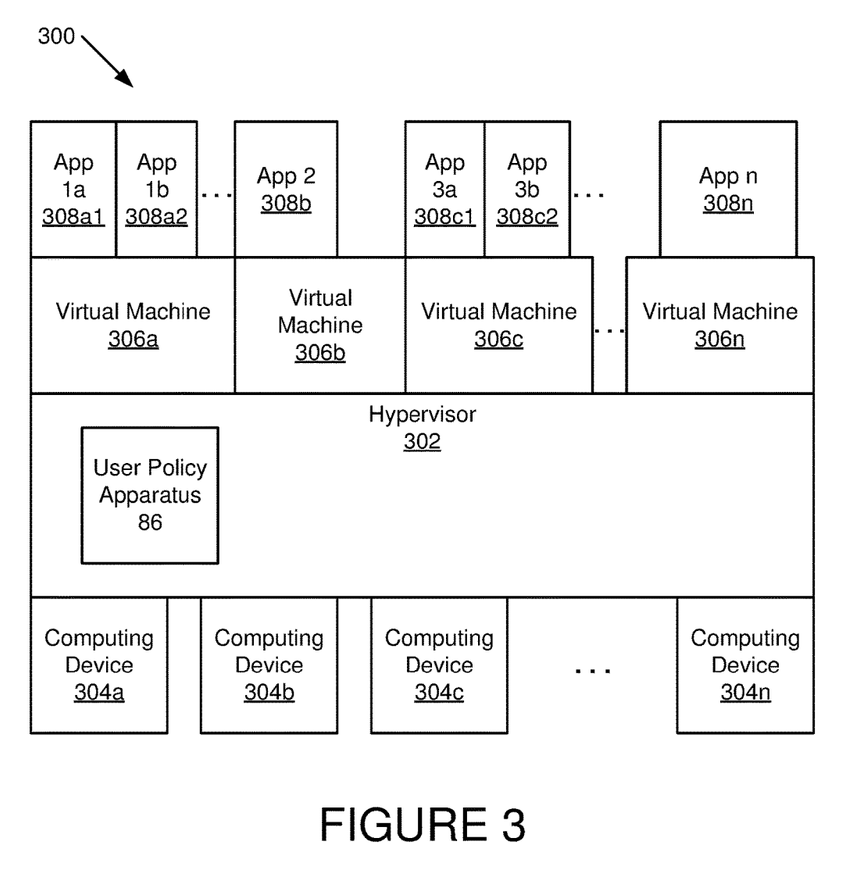
FIG. 3 is a schematic block diagram illustrating one embodiment of a system for implementing a user policy.

FIG. 3 is a schematic block diagram illustrating one embodiment of a system 300 for implementing a user policy. The system 300 includes an embodiment of the user policy apparatus 86, a hypervisor 302, computing devices 304a-304n (collectively or individually 304), virtual machines 306a-306n (collectively or individually 306), application 1a 308a1, application 1b 308a2, application 2 308b, application 3a 308c1, application 3b 308c2, and application n 308n (collectively or generically 308), which are described below.

The system 300 includes one embodiment of the user policy apparatus 86 located in the hypervisor 302. In other embodiments, the user policy apparatus 86 may include portions located in the computing devices 304 or other location. The user policy apparatus 86 issues a user policy that is typically not specific to a particular hardware configuration. Based on the user policy, the user policy apparatus 86 sends soft metrics for the computing devices 304. The user policy apparatus 86 then receives operational data from the computing devices 304 and analyzes the operational data to determine which computing devices comply with the user policy. Embodiments of the user policy apparatus 86 are discussed in more detail below with regard to the apparatuses 400, 500 of FIGS. 4 and 5.

The system 300 includes a hypervisor in communication with the computing devices 304. The hypervisor 302, in one embodiment, facilitates communication with the computing devices 304 as well as administrative functions, such as creation of virtual machines 306, distributing workload, assigning applications 308 to virtual machines, control of operation of the computing devices 304, and the like. The hypervisor 302 includes software, firmware and/or hardware. In one embodiment, the hypervisor 302 includes a CPU with one or more cores. The hypervisor 302, in one embodiment, is a blade server or a similar rack-mounted device. In another embodiment, the hypervisor 302 may be part of a mainframe computer that includes one or more of the computing devices 304. In one embodiment, the hypervisor 302 may be called a host machine and presents operating systems of the virtual machines 306, which may be called guest machines, with a virtual operating platform and manages the execution of the operating systems of the virtual machines 306. In one embodiment, the hypervisor 302 creates and/or manages logical partitions ("LPARs") or containers on a particular virtual machine running a particular operating system.

The system 300 includes two or more computing devices 304 managed by the hypervisor 302. The computing devices 304 each include one or more processors where each processor may include one or more cores. Typically, a processor executes a particular operating system and the computing devices 304 may run different operating systems on different processors. Each computing device 304 includes a specific hardware configuration. At least two computing devices 304 include different hardware configurations. Each hardware configuration may include a unique set of commands for controlling the computing devices 304 with the hardware configuration. For example, one computing device (e.g. 304a) may include CPUs that are different than the CPUs of a different computing device (e.g. 304b). In another example, computing devices 304 may have different amounts of memory, different memory types, etc. In another example, the various computing devices 304 may include different motherboards.

In one embodiment, each computing device 304 includes a data storage device. In another embodiment, the computing devices 304 have access to external data storage devices, such as through a storage area network ("SAN"). The data storage devices may be rack mounted or may be integral to the computing devices. One of skill in the art will recognize other variations of a hardware configuration.

The system 300 incudes one or more virtual machines 306 created by the hypervisor 302 from the resources of the computing devices 304. For example, one computing device (e.g. 306a) may span two or more computing devices 304. A virtual machine 306a may include other resources, such as access to one or more data storage devices. In another embodiment, two or more virtual machines 306 (e.g. 306b, 306c) may run on a single computing device (e.g. 304b). The virtual machines 306 may execute one or more applications 308. For example, a first virtual machine 306a may run application 1a 308a1 and application 1b 308a2 while a second virtual machine 306b may run application 2 308b.

The applications 308 may be assigned workloads (e.g. 90), which may have different requirements. For example, a particular workload 90 and associated application (e.g. 308b) may be memory intensive and may require a virtual machine (e.g. 306b) with a lot of memory. Another workload 90 and associated application (e.g. 308c1) may require optimal speed such that the virtual machine (e.g. 306c) executing the application 308c1 may require computing devices 304 to run at a top clock speed. In another example, a workload 90 and associated application (e.g. 308a2) may require a virtual machine 306a that saves energy so that the computing devices 304 supporting the virtual machine 306a are operating in an energy saving mode. One of skill in the art will recognize other operating conditions required for a particular workload 90 or for a user submitting the workload 90.

The virtual machines 306 are an emulation of a computer system where the virtual machine (e.g. 306a) may appear to a user submitting a load as a single machine where the computing devices 304 assigned to the virtual machine 306a may be hidden from the user. The virtual machines 306 may provide the functionality of a physical computer. Often, virtual machines operate in a cloud computing environment 50 where a user requests execution of a workload 90 and may require a particular application 308. The user may then allow the cloud computing environment 50 to provide appropriate resources based on requirements of a user, the workload 90 and/or application 308. The hypervisor 302 of the cloud computing environment 50 may then allocate appropriate resources to create or use a virtual machine (e.g. 306a) for execution of the workload 90.

The user may also issue a user policy associated with the workload. In one embodiment, the user policy is a plain language requirement, meaning that the user policy may be in terms that are spoken in the language of the user rather than computer commands. In another embodiment, a user policy is independent of a particular hardware configuration. For example, the user policy may be applicable at a high level to a variety of hardware configurations without sending hardware specific instructions.

The user policy may take various forms. For example, the user policy may be a performance policy, an energy policy, a memory policy, a speed policy, and the like. The performance policy may require optimal performance or performance at a particular level. Performance may include clock speed, execution time, a particular memory availability, etc. In one embodiment, performance includes energy usage so that execution is balanced with energy usage. One of skill in the art will recognize other performance parameters and metrics that may be part of a performance user policy.

The energy policy may minimize energy usage. For example, the energy policy may require computing devices 304 to operate at a particular efficiency or at a manufacturer-recommended or specified maximum efficiency. Energy efficiency may be in terms of electrical energy usage, cooling fluid temperature gain, heat generated, etc. One of skill in the art will recognize other ways to specify an energy policy.

A memory policy may include maintaining a high memory bandwidth utilization. For example, the memory policy may require a particular amount of usable memory or a certain amount of memory dedicated for a workload or application 308. The memory policy may also require a particular type of memory be available, such as level 1 cache, level 2 cache, etc. One of skill in the art will recognize other parameters and requirement for a memory policy.

A speed policy may include a particular execution speed for a virtual machine 306 executing a workload or an application 308. For example, the speed policy may include a requirement for a particular minimum instructions per second. One of skill in the art will recognize other parameters, requirements, etc. for a speed policy.

Figure 4:
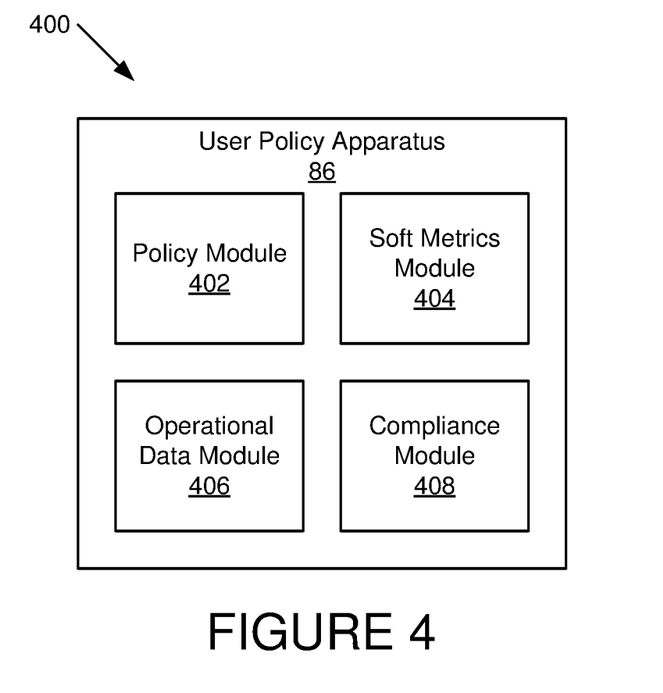
FIG. 4 is a schematic block diagram illustrating one embodiment of an apparatus for implementing a user policy.

FIG. 4 is a schematic block diagram illustrating one embodiment of an apparatus 400 for implementing a user policy. The apparatus 400 includes one embodiment of a user policy apparatus 86 that includes a policy module 402, a soft metrics module 404, an operational data module 406 and a compliance module 408, which are described below.

The apparatus 400 includes a policy module 402 that issues a user policy for a plurality of computing devices 304, where two or more of the computing devices 304 have different hardware configurations. For example, the hardware configuration for one computing device (e.g. 304a) may have a first hardware configuration while a second computing device (e.g. 304b) may have a second hardware configuration. The hardware configuration of the first computing device 304a may include a particular motherboard, a first CPU type with four cores, may have 32 gigabytes ("GB") of memory, etc. while the hardware configuration of the second computing device 304b may have a second CPU type with 6 cores, may have 64 GB of memory, etc.

The user policy may be a performance policy, a speed policy, an energy policy, etc. as described above. The user policy does not include machine-specific instructions or other commands directed to a particular hardware configuration, but instead is a generic, machine-independent policy that may be implemented on each of the computing devices 304 or may be presented to each of the computing device 304 to determine compliance with the user policy or potential for compliance with the user policy. The user policy may include one or more limits, requirements, etc. For example, a user policy in the form of a speed policy may include a minimum clock speed, instructions per second requirement, etc.

In one embodiment, the policy module 402 issues the user policy in response to input from a user. For example, the user may input information when initiating a workload, selecting one or more applications 308, setting up a virtual machine 306, and the like. As part of initiating a workload, the user may select an appropriate user policy so the policy module 402 then issues the user policy based on the user policy selected by the user.

The apparatus 400 includes a soft metrics module 404 that, in response to the user policy, sends soft metrics for a computing device (e.g. 304a) of the plurality of computing devices 304 to determine if the computing device 304a complies with the user policy. The soft metrics are specific to a hardware configuration of the computing device 304a. The soft metrics are commands, instructions, etc. that query the computing device 304a for operational data indicative of whether or not the computing device 304a complies with the issued user policy. For example, where the user policy is a memory policy, the soft metrics may query the computing device 304a to determine an amount of available memory in the computing device 304a.

The soft metrics module 404, in one embodiment, translates the general user policy into hardware specific instructions to be sent to the computing device 304a or to another device that has operational data about the computing device 304a. For example, the amount of available memory in the computing device 304a may be available in the hypervisor 302. In one embodiment, the soft metrics module 404 has a set of instructions that correspond with each user policy where the instructions are specific to a particular hardware configuration of one or more computing devices 304. In another embodiment, the soft metrics module 404 includes instructions that query a computing device 304 or command operational changes in a computing device 304. The soft metrics module 404 may send the soft metrics for one or more locations appropriate to query operational data pertaining to whether or not the computing device 304a complies with an issued user policy. Sending soft metrics for the computing device 304a includes sending soft metrics to a device, such as the hypervisor 302, that has operational data of the computing device 304a or that can issue commands to retrieve operational data of the computing device 304a.

The apparatus 400 includes an operational data module 406 that receives, from the computing device 304a, operational data responsive to the soft metrics. Receiving operational data from the computing device 304a includes receiving operational data from the computing device 304a and other devices, such as the hypervisor 302, connected to the computing device 304a that has operational data of the computing device 304a.

The operational data includes any sensor reading, parameter, data, etc. that provides information useful in determining whether or not the computing device 304a complies with the issued user policy. The operational data may include temperature information, such as core temperature, CPU temperature, ambient temperature, etc. of the computing device 304a, inlet and/or outlet coolant temperature of a cooling system servicing the computing device 304a, clock speed, memory availability, electrical input power and/or electrical output power of the computing device 304a, disk usage, network connection speed, and the like. One of skill in the art will recognize other types of operational data.

The apparatus 400 includes a compliance module 408 that analyzes the operational data to determine if the computing device 304a complies with the user policy. The compliance module 408 may include formulas, programs, routines, analytics, etc. that utilize the operational data to determine whether or not the computing device 304a complies with the user policy.

In one embodiment, the soft metrics module 404 sends different soft metrics for each hardware configuration of the plurality of computing devices 304. Each soft metrics is based on a particular hardware configuration of a computing device (e.g. 304a) of the plurality of computing devices 304. The operational data module 406 receives operational data from each computing device (e.g. 304a) of the plurality of computing devices 304 and the compliance module 408 analyzes operational data from each of the computing devices 304 to determine compliance with the user policy of each of the computing devices (e.g. 304a) of the plurality of computing devices 304. The analysis for a computing device (e.g. 304a) is based on the hardware configuration of the computing device 304a.

In another embodiment, the apparatus 400 includes multiple soft metrics modules 404. For example, the apparatus 400 includes a soft metrics module 404 for each hardware configuration or a soft metrics module 404 for each computing device 304. The various soft metrics modules 404 may be part of the hypervisor 302 or included with the computing devices 304. The embodiment may also include multiple operational data modules 406 and/or multiple compliance modules 408. Where the soft metrics modules 404, the operational modules 406 and/or the compliance modules 408 are part of the computing devices, the policy module 402 may send the user policy to the computing devices 304. The policy module 402 may be in the hypervisor 302, which is in communication with the computing devices 304.

Figure 5:
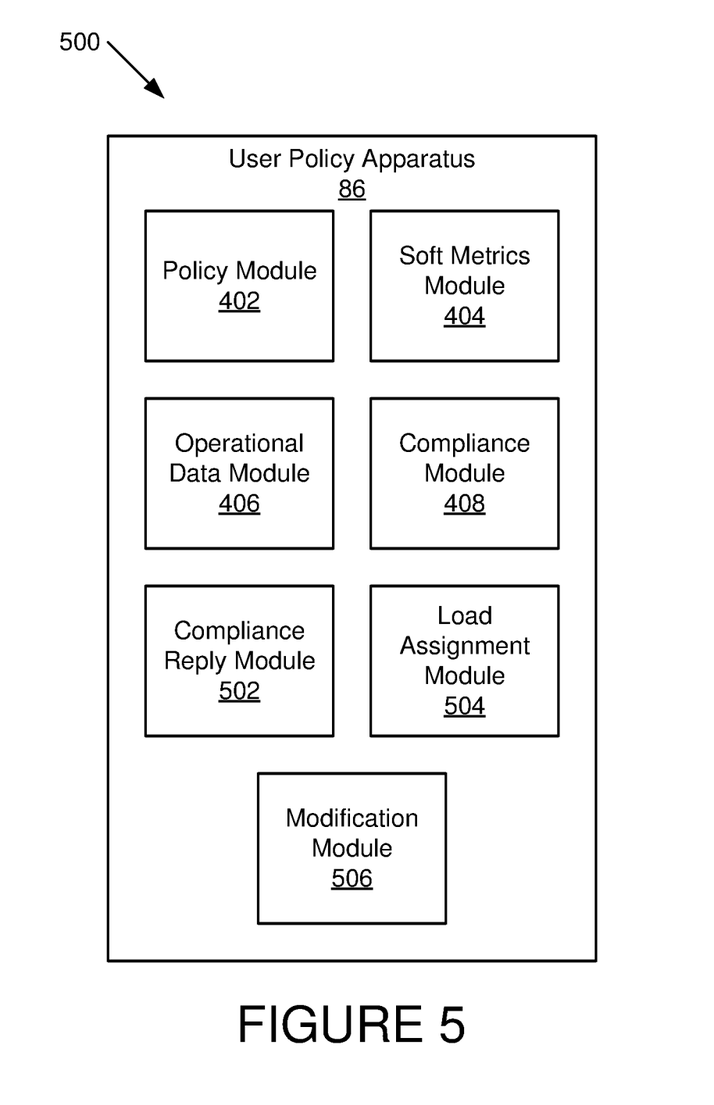
FIG. 5 is a schematic block diagram illustrating an alternate embodiment of an apparatus for implementing a user policy.

FIG. 5 is a schematic block diagram illustrating an alternate embodiment of an apparatus 500 for implementing a user policy. The apparatus 500 includes another embodiment of the user policy apparatus 86 with a policy module 402, a soft metrics module 404, an operational data module 406 and a compliance module 408, which are substantially similar to those describe above in relation to the apparatus 400 of FIG. 4. The apparatus 500 includes, in various embodiments, a compliance reply module 502, a load assignment module 504 and/or a modification module 506, which are described below.

The apparatus 500, in some embodiments, includes a compliance reply module 502 that sends a compliance message. The compliance message includes an indication of whether the computing device complies with the user policy and the compliance message is free from operational data. In one embodiment, the compliance reply module 502 sends the compliance message to a user. In another embodiment, the compliance reply module 502 sends the compliance message to the policy module 402 and the policy module 402 reports compliance.

The compliance message, in one example, includes compliance information for each of the computing devices 304. In another embodiment, the compliance message includes an indication of which of the plurality of computing devices 304 are compliance with the issued user policy. In another embodiment, the compliance message includes an indication of which of the plurality of computing devices 304 are not compliance with the issued user policy. The compliance message, in one embodiment, does not include operational data or other hardware specific data. Not including this operational data or hardware specific data may provide a reduced burden on the hypervisor 302 and other management functions, which may be advantageous.

The apparatus 500, in some embodiments, includes a load assignment module 504 that creates a virtual machine (e.g. 306*a*). The virtual machine 306*a* is operational on one or more computing devices 304*a* compliant with the user policy. The virtual machine 306*a* is configured to execute a workload in compliance with the user policy. In one embodiment, the compliance reply module 502 sends the compliance message to the hypervisor 302 and/or the load assignment module 504, which may then use information in the compliance message to set up a virtual machine (e.g. 306*a*) to execute a workload where the user policy is relevant to the workload. Compliance with the user policy of various computing devices 304 may be a primary factor for the load assignment module 504 in selecting computing devices 304 for creating an appropriate virtual machine.

The apparatus 500 includes, in some embodiments, modification module 506 that, in response to the compliance module 408 determining that a computing device (e.g. 304*a*) of the plurality of computing devices 304 is not in compliance with the user policy, sends updated soft metrics for the computing device 304*a*. The updated soft metrics include one or more commands to change operation of the computing device 304*a* to comply with the user policy. The operational data module 406 receives updated operational data in response to the updated soft metrics and the compliance module 408 analyzes the updated operational data to determine if the computing device 304*a* complies with the user policy.

In one embodiment, the updated software metrics may include commands to adjust operation of the computing device 304*a* to comply with the user policy. For example, the updated soft metrics may increase a clock speed of a CPU in the computing device 304*a* for a speed policy. In another example, the updated soft metrics may allocate memory of the computing device 304*a* for a memory policy. The operational data module 406 may then receive updated operational data after the changes caused by the updated soft metrics have been implemented and the compliance module 408 may then analyze the updated operational data to determine if the computing device 304*a* is in compliance with the user policy. The compliance reply module 502 may then send an updated compliance message with information as to whether or not the computing device 304*a* complies with the user policy after adjustments by the updated software metrics. Note that the embodiment described above with regard to the modification module 506 may include any number to computing devices 304.

In one embodiment, the compliance module 408 also determines if the computing device (e.g. 304*a*) of the plurality of computing devices 304 is capable of complying with the user policy. In one embodiment, the compliance reply module 502 sends a compliance message that includes an indication of whether the computing device 304*a* complies with the user policy and/or whether the computing device 304*a* is capable of compliance with the user policy. In another embodiment, the modification module 506 sends the updated soft metrics in response to the compliance module 408 determining that that computing device 304*a* is capable of compliance with the user policy.

Figure 6:
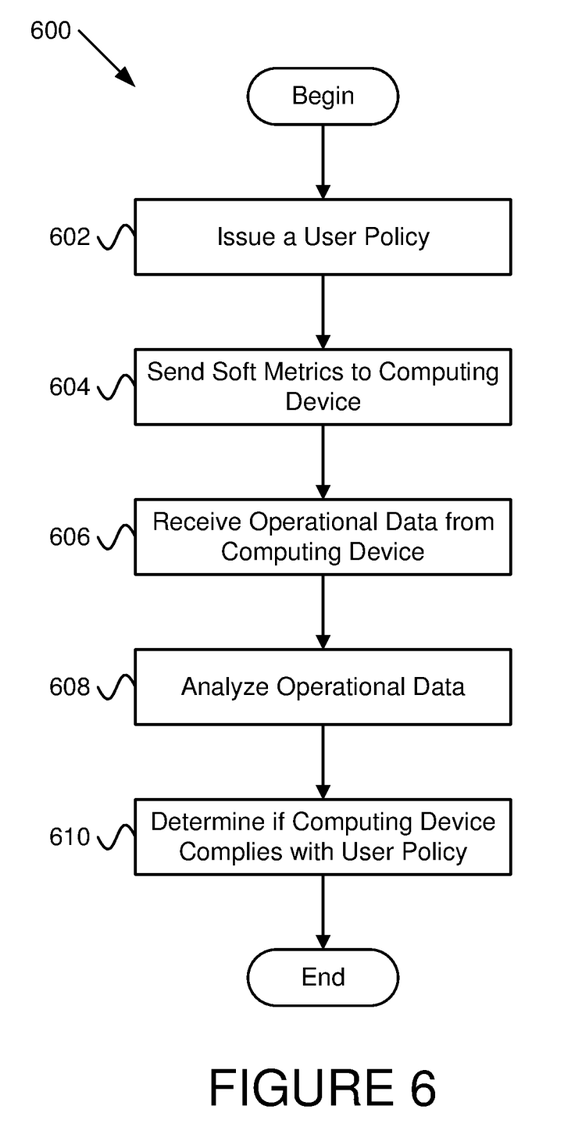
FIG. 6 is a schematic flow chart diagram illustrating one embodiment of a method for implementing a user policy.

FIG. 6 is a schematic flow chart diagram illustrating one embodiment of a method 600 for implementing a user policy. The method 600 begins and issues 602 a user policy for a plurality of computing devices 304. Two or more of the computing devices 304 have different hardware configurations. The method 600 sends 604, in response to the user policy, soft metrics for a computing device (e.g. 304*a*) of the plurality of computing devices 304, to determine if the computing device 304*a* complies with the user policy. The soft metrics are specific to a hardware configuration of the computing device 304*a*.

The method 600 an operational data module that receives 606, from the computing device 304*a*, operational data responsive to the soft metrics and analyzes 608 the operational data to determine 610 if the computing device 304*a* complies with the user policy. In some embodiments, the method 600 is implemented using one or more of the policy module 402, the soft metrics module 404, the operational data module 406 and/or the compliance module 408.

Figure 7:
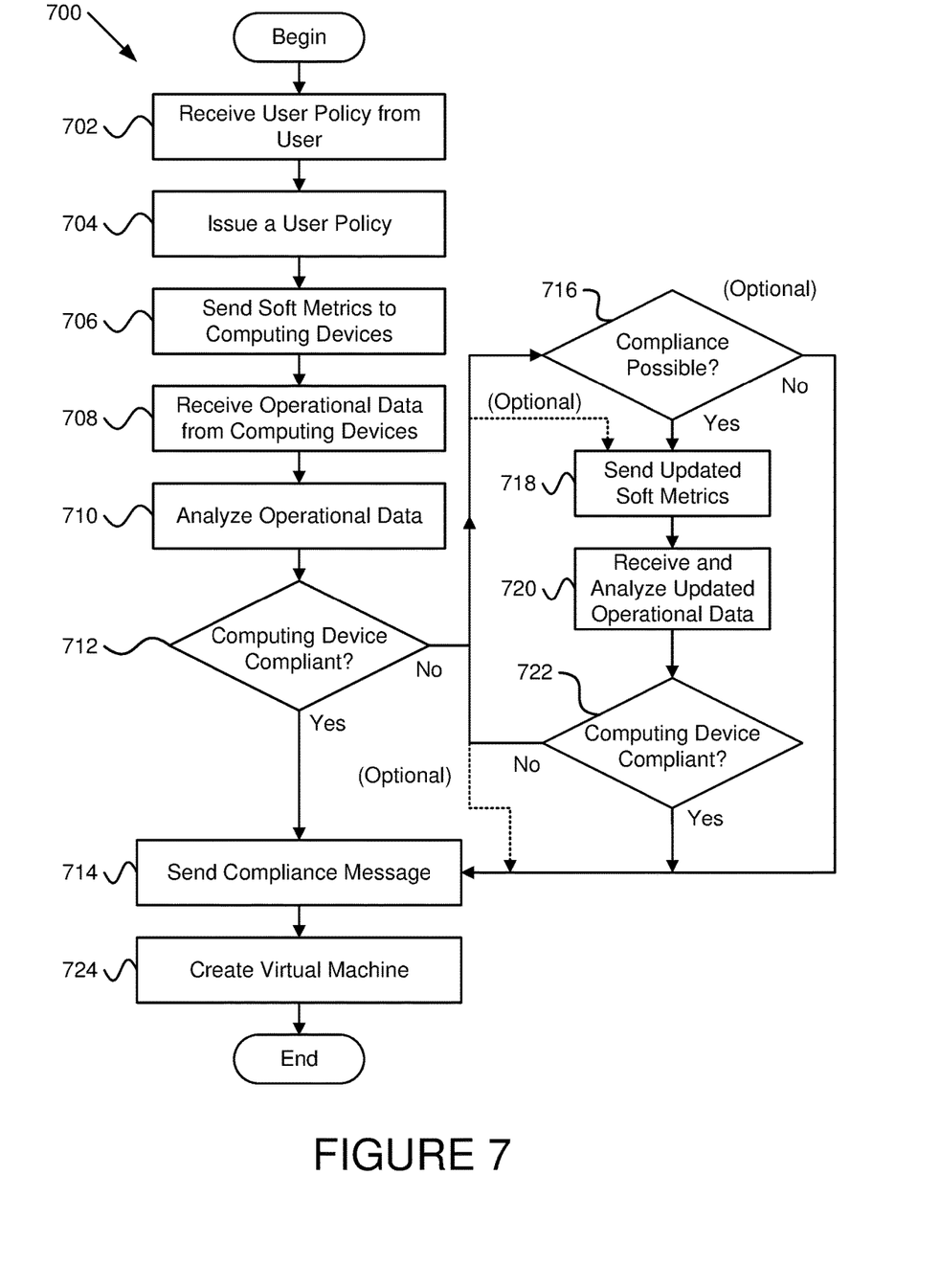
FIG. 7 is a schematic flow chart diagram illustrating another embodiment of a method for implementing a user policy.

FIG. 7 is a schematic flow chart diagram illustrating another embodiment of a method 700 for implementing a user policy. The method 700 begins and receives 702 a user policy 702 from the user and issues 704 a user policy for a plurality of computing devices 304. Two or more of the computing devices 304 have different hardware configurations. The method 700 sends 706, in response to the user policy, soft metrics for a computing device (e.g. 304*a*) of the plurality of computing devices 304, to determine if the computing device 304*a* complies with the user policy. The soft metrics are specific to a hardware configuration of the computing device 304*a*. The method 700 receives 708, from the computing device 304*a*, operational data responsive to the soft metrics and analyzes 710 the operational data and determines 712 if the computing device 304*a* complies with the user policy.

If the method 700 determines 712 that the computing device 304*a* complies with the user policy, the method 700 sends 714 a compliance message indicating that the computing device 304*a* complies with the user policy. If the method 700 determines 712 that the computing device 304*a* does not comply with the user policy, the method 700 optionally determines 716 if the computing device 304*a* is capable of complying with the user policy. If the method 700 determines 716 that the computing device 304a is not capable of complying with the user policy, the method 700 sends 714 a compliance message indicating that the computing device 304a does not comply with the user policy.

If the method 700 determines 716 that the computing device 304a is capable of complying with the user policy, the method 700 sends 718 updated soft metrics for the computing device 304a and receives 720 and analyzes 720 updated operational data and determines 722 if the computing device 304a is compliant with the user policy. If the method 700 determines 722 that the computing device 304a is not compliant with the user policy, the method 700 optionally returns and determines 716 if the computing device 304a is not capable of complying with the user policy. For example, the method 700 may send additional soft metrics to move the computing device 304a toward compliance with the user policy. If the method 700 determines 722 that the computing device 304a is compliant with the user policy, the method 700 sends 714 a compliance message indicating that the computing device 304a complies with the user policy, creates 724 a virtual machine (e.g. 306a) and the method 700 ends.

In another embodiment, the method 700 does not determine 716 if the computing device 304a is not capable of complying with the user policy and instead, in response to the method determining 712 that the computing device 304a does not comply with the user policy, the method 700 sends 718 updated soft metrics for the computing device 304a. In the embodiment, in response to the method 700 determining 722 that that the computing device 304a does not comply with the user policy, the method 700 returns and sends additional soft metrics for the computing device 304a.

In another embodiment, in response to the method 700 determining 722 that that the computing device 304a does not comply with the user policy, the method 700 sends 714 a compliance message indicating that the computing device 304a does not comply with the user policy. Note that the method 700 may repeat steps 706-722 for each computing device (e.g. 304b-304n) and the method 700 may send 714 a single compliance message or multiple compliance messages. In some embodiments, the method 700 is implemented using one or more of the policy module 402, the soft metrics module 404, the operational data module 406, the compliance module 408, the compliance reply module 502, the load assignment module 504 and/or the modification module 506.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a policy module that issues a user policy for a plurality of computing devices, wherein two or more of the computing devices comprise different hardware configurations;
    a soft metrics module that, in response to the user policy, sends soft metrics for a computing device of the plurality of computing devices, to determine if the computing device complies with the user policy, wherein the soft metrics are specific to a hardware configuration of the computing device;
    an operational data module that receives, from the computing device, operational data responsive to the soft metrics; and
    a compliance module that analyzes the operational data to determine if the computing device complies with the user policy,
    wherein said modules comprise one or more of hardware and executable code, the executable code stored on one or more computer readable storage media.

2. The apparatus of claim 1, further comprising a compliance reply module that sends a compliance message, the compliance message comprising an indication of whether the computing device complies with the user policy, the compliance message free from operational data, wherein the compliance ready module comprises one or more of hardware and executable code, the executable code stored on one or more computer readable storage media.

3. The apparatus of claim 2, further comprising a load assignment module that creates a virtual machine, the virtual machine operational on one or more computing devices compliant with the user policy, the virtual machine configured to execute a workload in compliance with the user policy, wherein the load assignment module comprises one or more of hardware and executable code, the executable code stored on one or more computer readable storage media.

4. The apparatus of claim 1, wherein the soft metrics are specific to the hardware configuration of the computing device.

5. The apparatus of claim 1, wherein the soft metrics module sends different soft metrics for each hardware configuration of the plurality of computing devices, each soft metrics based on a particular hardware configuration of a computing device of the plurality of computing devices, the operational module receives operational data from each computing device of the plurality of computing devices and the compliance module analyzes operational data from each of the computing devices to determine compliance with the user policy of each of the computing devices of the plurality of computing devices, the analysis for a computing device based on the hardware configuration of the computing device.

6. The apparatus of claim 1, wherein a user policy is free from soft metrics specific to a particular hardware configuration.

7. The apparatus of claim 1, wherein the policy module operates via a hypervisor in communication with the plurality of computing devices.

8. The apparatus of claim 1, further comprising a modification module that, in response to the compliance module determining that a computing device of the plurality of computing devices is not in compliance with the user policy, sends updated soft metrics for the computing device, the updated soft metrics comprising one or more commands to change operation of the computing device to comply with the user policy, wherein the operational module further receives updated operational data in response to the updated soft metrics and the compliance module further analyzes the updated operational data to determine if the computing device complies with the user policy, wherein the modification module comprises one or more of hardware and executable code, the executable code stored on one or more computer readable storage media.

9. The apparatus of claim 1, wherein the user policy comprises one of a performance policy, an energy policy, a memory policy, and a speed policy, wherein the performance policy comprises optimal performance, the energy policy minimizes energy usage, the memory policy comprises maintaining a high memory bandwidth utilization, and the speed policy maximizes execution time.

10. The apparatus of claim 1, wherein the policy module issues the user policy in response to input from a user.

11. The apparatus of claim 1, wherein the compliance module further determines if the computing device of the plurality of computing devices is capable of complying with the user policy and further comprising a compliance reply module that sends a compliance message, the compliance message comprising an indication of one or more of whether the computing device complies with the user policy and whether the computing device is capable of compliance with the user policy, the compliance message free from operational data.

12. A method comprising:
    issuing a user policy for a plurality of computing devices, wherein two or more of the computing devices comprise different hardware configurations;
    sending, in response to the user policy, soft metrics for a computing device of the plurality of computing devices, to determine if the computing device complies with the user policy, wherein the soft metrics are specific to a hardware configuration of the computing device;
    receiving, from the computing device, operational data responsive to the soft metrics; and
    analyzing the operational data to determine if the computing device complies with the user policy.

13. The method of claim 12, wherein the method comprises sending a compliance message, the compliance message comprising an indication of whether the computing device complies with the user policy, the compliance message free from operational data.

14. The method of claim 13, wherein the method comprises creating a virtual machine, the virtual machine operational on one or more computing devices compliant with the user policy, the virtual machine configured to execute a workload in compliance with the user policy.

15. The method of claim 12, wherein
    sending soft metrics further comprises sending different soft metrics for each hardware configuration of the plurality of computing devices, each soft metrics based on a particular hardware configuration of a computing device of the plurality of computing devices;
    receiving operational data comprises receiving operational data from each computing device of the plurality of computing devices; and
    analyzing the operational data comprises analyzing operational data from each of the computing devices to determine compliance with the user policy of each of the computing devices of the plurality of computing devices, the analysis for a computing device based on the hardware configuration of the computing device.

16. The method of claim 12, further comprising, in response to determining that a computing device of the plurality of computing devices is not in compliance with the user policy, sending updated soft metrics for the computing device, the updated soft metrics comprising one or more commands to change operation of the computing device to comply with the user policy, and further comprising receiving updated operational data in response to the updated soft metrics and analyzing the updated operational data to determine if the computing device complies with the user policy.

17. The method of claim 12, further comprising issuing the user policy in response to input from a user.

18. The method of claim 12, wherein determining if the computing device complies with the user policy further comprises determining if the computing device of the plurality of computing devices is capable of complying with the user policy and further comprising sending a compliance message, the compliance message comprising an indication of one or more of whether the computing device complies with the user policy and whether the computing device is capable of compliance with the user policy, the compliance message free from operational data.

19. A method for deploying a computer program product, comprising integrating program instructions into a computing system, wherein the program instructions in combination with the computing system performs the following:
    issuing a user policy for a plurality of computing devices, wherein two or more of the computing devices comprise different hardware configurations;
    sending, in response to the user policy, soft metrics for a computing device of the plurality of computing devices, to determine if the computing device complies with the user policy, wherein the soft metrics are specific to a hardware configuration of the computing device;
    receiving, from the computing device, operational data responsive to the soft metrics; and
    analyzing the operational data to determine if the computing device complies with the user policy.

20. The method of claim 19, wherein the program instructions in combination with the computing system further sends a compliance message, the compliance message comprising an indication of whether the computing device complies with the user policy, the compliance message free from operational data.

* * * * *